May 29, 1973   H. C. CROOM   3,736,254
SYSTEM FOR REMOVING COLOR FROM PAPER MILL LIQUID WASTE
Filed June 3, 1971
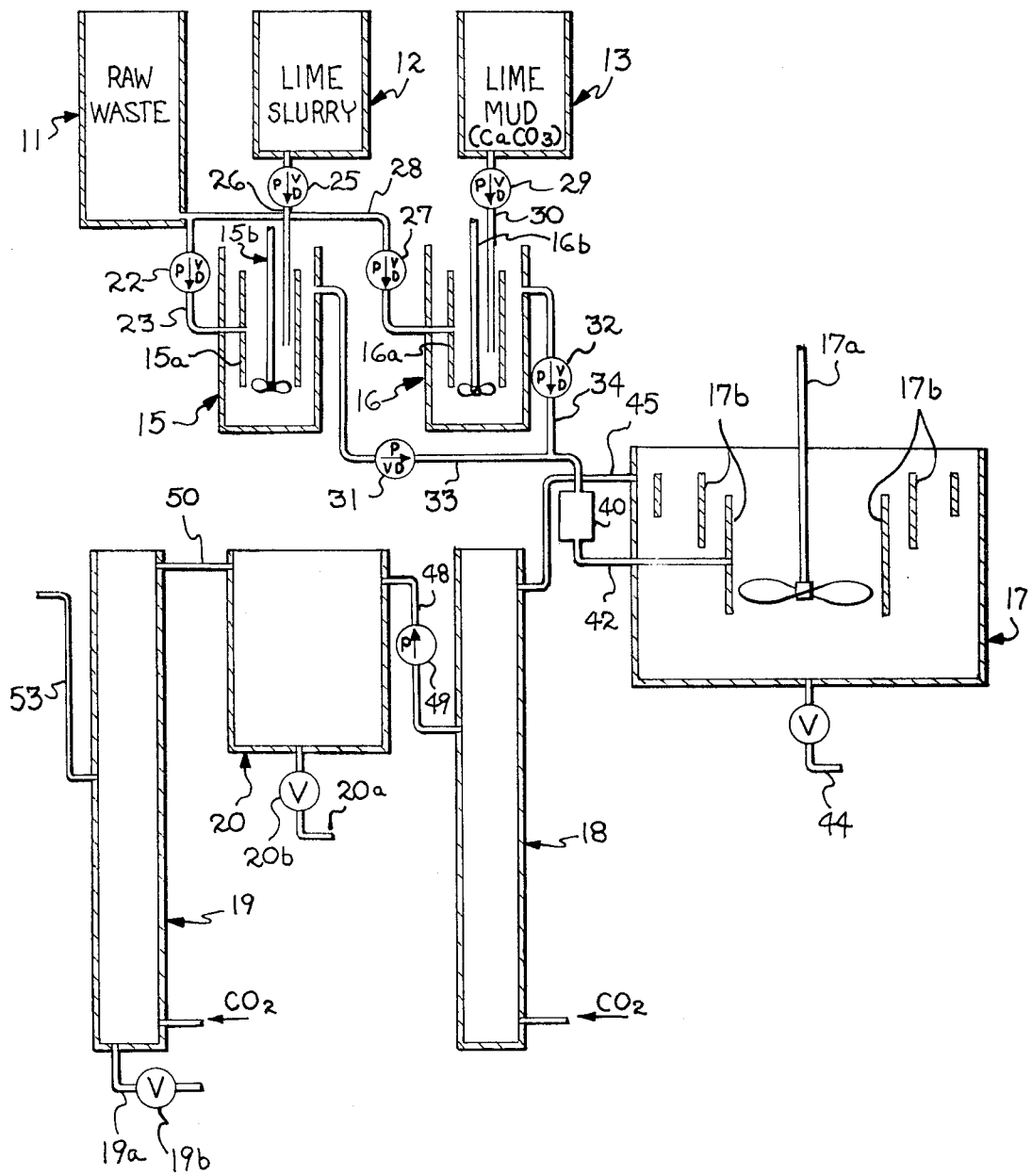
INVENTOR.
HARDY CHURCH CROOM
BY Richard D. Heberling
and E. J. Holler
ATTORNEYS

United States Patent Office 3,736,254
Patented May 29, 1973

3,736,254
SYSTEM FOR REMOVING COLOR FROM PAPER MILL LIQUID WASTE
Hardy C. Croom, Valdosta, Ga., assignor to Owens-Illinois, Inc.
Filed June 3, 1971, Ser. No. 149,534
Int. Cl. C02c 5/02
U.S. Cl. 210—51         7 Claims

ABSTRACT OF THE DISCLOSURE

Waste effluent liquid from a paper mill is intimately mixed with a water slurry of lime and a water slurry of lime mud, composed principally of calcium carbonate, under alkaline conditions; the resulting mixture being subjected to clarification separation of formed precipitants; following which, the liquid effluent overflow is carbonated by the bubbling of carbon dioxide gas therethrough to precipitate calcium carbonate and residual color-imparting entities and to effect adjustment of the pH to approximately neutral conditions whereby the resultant liquid is adapted for discharge.

---

The present invention relates generally to the art to paper manufacture from wood. More particularly, the present invention relates to a proposed treatment of waste discharge liquid from a paper mill employing, in some degree at least, chemical pulping of wood. Wood, of course, contains a large amount of cellulose useful in making papers of all kinds. A variety of chemicals including sodium sulphate, sodium sulphite, sodium sulphide and alkaline metal bisulphites are employed to chemically attack the lignins and other bonding constitutents which hold the cellulose as an integrated whole body which is the wood chip.

Over the years there have been improvements and refinements in pulping technology directed not only to efficiency of the pulping in terms of production of cellulose per a given amount of input timber but also to recover the chemicals employed. The usage of large amounts of water and the employment of chemicals therein to enhance the pulping necessarily envision the return of water to the source of the original water, be it a lake, river, stream or the like.

From an ecological standpoint, it is, of course, desirable to return water to the source, that is, so-called surface water, which is not polluted as would otherwise destroy or adversely affect further use of the water. The significance of this has increased in recent years, with a general national emphasis on the abatement of stream pollution. In this regard, water which is discolored due to the presence of colored bodies is aesthetically objectionable, particularly where the body of water is used as a source of water supply for a nearby community or is used by the nearby population for purposes of recreation.

The coloration of the water used in pulping is believed in part due to the byproducts of the chemical attack of the bonding constituents which hold together the cellulose as to constitute the wood or timber. These byproduct substances are complex long-chain resinous complexes formed by the reaction combining of the pulping chemicals with the lignin. According to one explanation advanced, the color bodies are formed by the combining of calcium ion with phenolic groups and eonolic groups formed in the hydrolysis of the lignin. These coloration-imparting entities or color bodies are extremely small, even minute, and their removal is not easily accomplished, ncessitating considerable effort on the part of the pulping industry to develop methods for a color removal. It is known that the addition of hydrated lime to effluent from pulping process will result in some precipitation of the color bodies. The precipitate, however, is gelatinous and extremely difficult to separate for disposal. Furthermore, hydrated lime must be present in fairly high concentration to be effective, which adds to the expense.

It is a general object of the present invention to provide a system for accomplishing efficient color removal from raw waste liquid effluent from a paper mill.

It is another object of the present invention to provide a method which is conveniently integrated into existing pulping systems and which features the employment of treating chemical additives which are present in the existing pulping processes under consideration.

It is yet another object of the present invention to provide a method which is economical and at the same time extremely efficient in terms of color removal.

It is a significant object of the present invention to provide a method requiring relatively simple and relatively available equipment.

In accordance with the present invention, the waste liquid is passed through several sequential steps including (1) lime and lime mud additions, (2) mixing, (3) clarification and (4) carbonation, resulting ultimately in a discharge liquid which is in condition for return to the source body of water with certain process effluents and precipitates being redirectable into the process itself or into the pulping process.

The foregoing, as well as other objects of the present invention, will become apparent to those skilled in the art from the following detailed description taken in conjunction with the annexed single sheet of drawings on which there is presented, for purpose of illustration only, a principal embodiment of the present invention comprising a sequence of process steps carried out in designated apparatus.

IN THE DRAWINGS

The single figure is a schematic representation illustrating liquid flow and liquid additions followed through a plurality of vessels, resulting in an ultimate color-free effluent.

Viewed most simply, the present invention comprises treating a pulping liquid waste effluent with available lime slurries, one of which is a hydrated lime and one of which, lime mud, comprises essentially calcium carbonate, followed by a clarification separation and thence carbon dioxide treatment of the effluent from the clarification to remove residual color bodies with precipitated calcium salts and to achieve an adjustment of pH to an approximately neutral level.

Reference may now be had to the single sheet of drawings wherein there is disclosed an array of vessels and connecting lines for moving liquids in sequential fashion from one to the other for mixing, clarifying and treating in a manner as will be now more particularly described.

In the drawings, a holding tank 11 contains mixed waste liquid from mill and storage ponds normally requiring undesirable out-of-mill settling treatment. Reference numeral 12 designates a holding tank for a supply of hydrated lime $Ca(OH)_2$, e.g., calcium hydroxide. Reference numeral 13 designates a holding or supply tank for washed white liquor clarifier "mud" from the caustic room which is an adjunct to most pulping operations and which consists essentially of calcium carbonate. Reference numerals 15 and 16 identify liquid mixing tanks; reference numeral 17 identifies a rather large clarifier and reference numerals 18 and 19 identify vertical carbonation towers in between which is positioned a settling tank 20. The above recited equipment comprises the essential apparatus vessels for carrying out the method of reducing or removing color bodies from waste pulp liquid effluent.

In accordance with the principal embodiment of the present invention, a proportion of the raw waste liquid is pumped via pump 22 through line 23 leading from holding tank 11 to the interior regions of mixing tank 15; the latter being provided with interior baffle 15a and an appropriately driven mixer 15b. Simultaneously, an amount of hydrated lime is pumped via pump 25 through line 26 leading from lime holding tank 12 into the interior of mixing tank 15, as shown. Also at the same time, a separate amount of raw waste is pumped via pump 27 through line 28 leading from the raw waste liquid holding tank 11 to mixing tank 16 which, like tank 15, contains interior baffle 16a and an appropriately driven bladed stirrer 16b. Also simultaneously, an amount of lime mud comprising essentially of calcium carbonate is pumped via pump 29 through line 30 into the interior of mixing tank 16 where the two liquids, namely, the raw waste liquid and the slurry of calcium carbonate, are intimately mixed. In tank 15, the amount of raw waste liquid and an amount of hydrated lime are intimately mixed together. The slurry mixtures from tank 15 and tank 16 are respectively pumped via pump 31 and pump 32 through lines 33 and 34 to an "inline" mixer 40 from which the merged mixture of the two streams, contained respectively in lines 33 and 34, pass via line 42 to the clarifier tank 17, as shown. The tank 17 includes an appropriately driven stirrer 17a and an array of baffles 17b. Bottom discharge line 44 leads to a precipate or sludge storage while line 45 at the top of the clarifier tank 17 carries effluent to the first carbonation tower 18.

Carbon dioxide ($CO_2$) is fed through pipe 46 laterally into the bottom of first carbonation tower 18. The carbonation tower 18 may be "packed" or provided with suitable interior structure as to provide efficient gas/liquid contact between the $CO_2$ gas and the liquid effluent or overflow entering through pipe 45. Carbonated liquid is passed via line 48 as urged by pump 49 to settling tank 20. Settled solids (inclusive of residual calcium carbonate and color bodies) emerge from the bottom through line 20a as controlled by valve 20b. Overflow effluent from settling tank 20 passes via line 50 to carbonation tower 19 which is constructed similarly to carbonation tower 18. Carbon dioxide ($CO_2$) gas is introduced to the carbonation tower near the bottom thereof through line 52. Settled solids are exited through line 19a as controlled by valve 19b. Finally treated discharge waste leaves carbonation tower 19 through exit line 53.

In the carrying out of the practice of the present invention, an amount of raw waste was treated in accordance with the sequence of steps set forth hereinabove in connection with the description of the schematically illustrated assembly of apparatus components in the drawings. The raw waste liquid, for example, that in holding tank 11, measured 1500–2000 true color units as determined by the known platinum-cobalt method of determining color value which is described in the text, "Standard Methods For Determination of Water and Waste Water," twelfth edition. An amount of raw waste was mixed with an amount of a lime slurry, while at the same time an amount of raw waste was intimately mixed with an appropriate amount of lime mud comprising essentially of calcium carbonate. The two resulting mixtures were mixed in an "inline" mixer identified by the reference numeral 40. The "inline" mixer may be a physical impeller mixer, a jet action mixer or an educator type of mixer providing an intimate contact and mixing of the two streams. The mixed liquid in mixer 40 and line 42 was determined to contain about 200 to 250 parts per million of lime as $Ca(OH)_2$ and 250 400 parts per million of lime mud calculated on the basis of $CaCO_3$. This proportion is eminently satisfactory and is achieved by determination of the concentration of hydrated lime and calcium carbonate in feed tanks 12 and 13 and appropriate control of pumps 22, 25, 27 and 29. The pH of the liquid mixture carried in line 42 and as introduced to clarifier 17 measured at the high end of the pH scale; that is, in the neighborhood of about 11.0 to 13.0. While in the clarifier, precipitation of calcium carbonate and conjoint agglomeration separation of color bodies from the liquid slurry occur particularly at the high pH. Overflow effluent from the clarifier 17 was passed to carbonation tower 18 from which it proceeds to settling tank 20 and thence to secondary carbonation tower 19. Precipitation of residual calcium carbonate and conjoint agglomeration separation of residual color bodies also occur in the carbonation towers and particularly in settling tank 20. Discharge liquid exiting from tower 19 through pipe line 53 was found suitable for discharge to a source body of water such as the lake, river or stream. Thus, the discharge water was marked by (1) efficient and marked color removal in the range of 85 to 95% and (2) a measured pH of approximately neutral due to the residence time and contact with carbon dioxide in the carbonation towers and settling tank. Liquid in the first carbonation tower 18 had a measured pH of about 11.0 to 12.0.

It will be appreciated that higher concentrations of hydrated lime [calculated on the bas of $Ca(OCH)_2$] and lime mud [calculated on the basis of $CaCO_3$[ will be indicated with raw waste liquid possessing color values higher than that recited hereinabove.

Generally, in accordance with the present invention, the (1) raw waste liquid, (2) hydrated lime slurry and (3) lime mud slurry are desirably combined in such relative proportion and amounts that the calcium carbonate [$CaCO_3$] provided by the lime mud slurry is present in the total slurry in an amount which is at least equal to the hydrated lime, calculated as $Ca(OH)_2$, provided by the hydrated lime slurry. The lime mud usage desirably and significantly reduces the amount of hydrated lime that might otherwise be required to counteract the level of color bodies in the raw waste liquid to be treated.

It is a collateral and subsidiary feature of the present invention that the color removal method herein outlined is compatible with conventional chemical and semi-chemical pulp operations, required no expensive modifications or changes. The lime slurry, of course, can be prepared from fresh lime or burned lime could be used. Lime mud is readily available and its use contributes to the advantages in economy.

The precipitate and/or sludge from setting tank 20 is conveniently passed via line 20a to the clarifier 17, although this is not specifically shown in the drawings. Sludge precipitate collecting at the bottom of clarifier 17 passes through line 44 to a sludge storage and is usually conveniently processed through a kiln such as a lime recovery kiln for recovery of the chemical values therein.

In the foregoing, the raw waste liquid has been described as being divided into essentially two components; one mixed with a lime slurry and the other mixed with a lime mud; following which, the two streams are merged and intimately mixed. It is possible within the framework of the present invention, although not as completely desirable, for the entire amount of raw waste liquid to be sequentially combined first with the lime slurry and thence with the lime mud slurry.

It will be appreciated that modifications, including the substitution of equivalent chemicals and equivalent equipment, can be made without departing from the spirit and scope of the present invention and all such are to be considered as included within the invention unless to do so would violate the language of the appended claims.

I claim:

1. A method of treating discolored paper mill waste liquid effluent to remove color bodies therein which impart objectionable coloration to said waste liquid, said method comprising:

(1) concomitantly adding to said discolored waste liquid (a) a slurry of hydrated lime and (b) a slurry of lime mud comprising essentially calcium carbonate ($CaCO_3$) to form a slurry mixture, said additives being in such relative amount that said slurry mixture is significantly alkaline, (2) intimately mixing said slurry mixture of step (1), (3) subjecting said step (2) mixture to clarification precipitation of calcium salts and conjoint agglomeration separation of color bodies and (4) carbonating the effluent from said clarification of step (3) with carbon dioxide to effect (a) precipitation of residual calcium salts, (b) conjoint agglomeration separation of residual color bodies and (c) reduction of effluent pH to approximately neutral.

2. The method as claimed in claim 1, wherein said alkaline slurry mixture of step (1) measures above about 11.0 on the pH scale.

3. A method of removing color bodies present in waste liquid effluent normally discharged from a paper mill, said method comprising the steps of:

(1) admixing an amount of said waste liquid effluent and a slurry of lime to form a slurry thereof, (2) admixing a separate amount of said waste liquid and a slurry of lime mud comprising essentially calcium carbonate to form a slurry thereof, (3) intimately admixing said slurries of steps (1) and (2) together in relative amounts that said intimate mixture measures an alkaline pH, (4) clarifying said mixture of step (3) while alkaline to effect precipitation of calcium salts and conjoint agglomeration separation of color bodies and (5) carbonating the effluent from step (4) with carbon dioxide, promoting thereby further precipitation of calcium salts and conjoint agglomeration of color bodies.

4. The method as claimed in claim 3, wherein carbonation effluent from step (5) is carbonated with additional $CO_2$ until effluent overflow measures a pH of approximately neutral.

5. The method as claimed in claim 4, wherein effluent of step (5) is subject to settling of formed precipitate before additional $CO_2$ addition.

6. The method as claimed in claim 3, wherein the amounts of (a) lime slurry, $Ca(OH)_2$, (2) lime mud comprising essentially $CaCO_3$ and (3) waste liquid are selected such that the pH of hte admixture of the two slurries of steps (2) and (3) measures in the high alkaline range, namely, above 10.0.

7. The method as claimed in claim 3, wherein the amounts of lime, lime mud comprising essentially calcium carbonate and waste are proportioned such that the admixture thereof possesses a pH commensurate with the solubility limit of calcium carbonate and calcium hydroxide, whereby precipitation and/or sedimentation of calcium carbonate is initiated together with conjoint agglomeration separation of said color bodies.

References Cited

UNITED STATES PATENTS

| | | | |
|---|---|---|---|
| 693,316 | 2/1902 | Tralls | 210—52 |
| 2,072,154 | 3/1937 | Butterfield | 210—45 |
| 2,359,748 | 10/1944 | Clemens | 210—45 |
| 1,263,532 | 4/1918 | Cummings | 210—42 |
| 3,531,370 | 9/1970 | Gould | 210—45 X |

OTHER REFERENCES

Thibodeaux and Berger, appearing on p. 1128, Journal WPCF, June 1968, vol. 40, pp. 1128 and 1139.

MICHAEL ROGERS, Primary Examiner

U.S. Cl. X.R.

162—33; 210—45, 53